United States Patent [19]

Nagato et al.

[11] Patent Number: 4,511,665

[45] Date of Patent: Apr. 16, 1985

[54] DECORATIVE HARD GOLDEN CERAMIC ARTICLE

[75] Inventors: Yoshio Nagato, Kokubu; Kazunori Soroi, Sendai, both of Japan

[73] Assignee: Kyocera Corporation, Kyoto, Japan

[21] Appl. No.: 535,739

[22] Filed: Sep. 26, 1983

[30] Foreign Application Priority Data

Sep. 30, 1982 [JP]  Japan ................................ 57-173769

[51] Int. Cl.$^3$ ...................... C04B 35/10; C04B 35/48; C04B 35/58
[52] U.S. Cl. ...................................................... 501/96
[58] Field of Search ................................... 501/96, 98

[56] References Cited

U.S. PATENT DOCUMENTS 3,514,271  5/1970  Yates ...................................... 501/96
3,652,304  3/1972  Daniels ................................... 501/96

Primary Examiner—Mark Bell
Attorney, Agent, or Firm—Spensley Horn Jubas & Lubitz

[57] ABSTRACT

Disclosed is a decorative hard golden article comprising at least one member selected from titanium nitride and zirconium nitride as a main component and 0.1 to 30% by weight of at least one member selected from alumina ($Al_2O_3$) and zirconia ($ZrO_2$).

In this decorative hard golden article, the corrosion resistance is highly improved while the flexural strength and hardness are maintained at high levels.

8 Claims, No Drawings

DECORATIVE HARD GOLDEN CERAMIC ARTICLE

BACKGROUND OF THE INVENTION (1) Field of the Invention

The present invention relates to an improvement of the corrosion resistance in the decorative hard golden ceramic article comprising titanium nitride (TiN) or zirconium nitride (ZrN).

(2) Description of the Prior Art

Sintered alloys comprising a carbide, nitride or carbonitride of a transition metal of the Group IV or V, such as TiN, ZrN or TaC, as the main component and a binder metal such as Fe, Co, Ni or Mo has not only a golden hue but also such excellent properties as high hardness and high strength. Accordingly, these sintered alloys are broadly used as decorative articles in order to obtain sintered alloy having high hardness and high strength.

Sintering of TiN, ZrN or TaC alone is very difficult, and therefore, a binder metal as mentioned above is added as a sintering aid. Since the sintering aid is a metal element, corrosion of the metal component present in the sintered alloy is readily advanced, and discoloration is caused, for example, by sweat and the hue of the decorative article is impaired.

SUMMARY OF THE INVENTION

We made research with a view to eliminating the above defect, and as the result, it was found that if a powder of alumina ($Al_2O_3$) and/or zirconia ($ZrO_2$) is added as a sintering aid at a specific ratio to a starting powder of TiN and/or ZrN and the resulting powder mixture is molded and sintered, the corrosion resistance is improved and an excellent decorative hard golden ceramic article is obtained. We have now completed the present invention based on this finding.

It is therefore a primary object of the present invention to provide a decorative hard golden ceramic article excellent in the corrosion resistance.

More specifically, in accordance with the present invention, there is provided a decorative hard golden ceramic article comprising at least one member selected from titanium nitride and zirconium nitride as a main component and 0.1 to 30% by weight of at least one member selected from alumina ($Al_2O_3$) and zirconia ($ZrO_2$).

DETAILED DESCRIPTION OF THE INVENTION

In the decorative hard golden ceramic article of the present invention, alumina and/or zirconia is added as a sintering aid in an amount of 0.1 to 30% by weight. If the amount incorporated of the sintering aid is smaller than 0.1% by weight or exceeds 30% by weight, sintering becomes difficult. Accordingly, in the present invention, alumina and/or zirconia is incorporated in an amount of 0.1 to 30% by weight, preferably 2 to 20% by weight. Ordinarily, a smaller amount incorporated of the sintering aid gives a golden color having a yellowish tint.

The particle size of the starting powder of alumina and/or zirconia is smaller than 2.0 microns, preferably smaller than 1.0 micron. The starting powder of alumina and/or zirconia may be added at the step of preparing the starting material powder. In the case where the amount incorporated of the sintering aid is relatively small, for example, 5% by weight or less, there may be adopted a method in which an alumina ball or zirconia ball is added to the starting material powder and a predetermined amount of the powder of alumina or zirconia is incorporated into the starting material powdery by abrasion.

According to the process for preparing the golden ceramic article of the present invention, a mixture formed by adding a powder of alumina and/or zirconia to a starting material powder of TiN and/or ZrN is compression-molded and the molded mixture is sintered in a non-oxidizing atmosphere such as nitrogen or argon or in vacuum. The sintering temperature is preferably about 1600° to about 1900° C. In the case where sintering is carried out in a vacuum furnace, the degree of vacuum is adjusted to $10^{-2}$ to $10^{-5}$ Torr. Thus, a decorative hard golden ceramic article excellent in the corrosion resistance can be obtained.

The present invention will now be described in detail with reference to the following Example that by no means limits the scope of the invention.

EXAMPLE

A starting powder comprising at least one member selected from alumina and zirconia was added to a starting material powder comprising at least one member selected from TiN and ZrN at a ratio shown in Table 1, and the mixture was pulverized for about 60 hours in acetone or methanol. The pulverized mixture was dried and 4% by weight of paraffin as added thereto, and the mixture was compression-molded under a pressure of 1.0 ton/cm². After removal of the binder, sintering was carried out at 1750° to 1850° C. under a pressure of $10^{-4}$ Torr in a vacuum furnace. The sintered product was subjected to mirror polishing, and the hue, flexural strength, Vickers hardness (Hv) and corrosion resistance of the product were tested. The flexural strength was measured according to the three-point bending test method of JIS R-1601, and the corrosion resistance was determined according to the sweat resistance test method in which artificial sweat having a composition equivalent to the composition of human sweat was used and the sample was dipped in this artificial sweat. The obtained results are shown in Table 1.

TABLE 1

| Sample No. | TiN | ZrN | $Al_2O_3$ | $ZrO_2$ | Ni | Mo |
|---|---|---|---|---|---|---|
| 1* | 99.94 | | | 0.06 | | |
| 2* | | 99.95 | 0.05 | | | |
| 3 | 99.8 | | | 0.2 | | |
| 4 | 99.5 | | 0.5 | | | |
| 5* | 99.5 | | | | 0.5 | |
| 6 | 79.5 | 19.9 | | 0.6 | | |
| 7 | 94.6 | | | 5.4 | | |
| 8 | | 94.2 | | 5.8 | | |
| 9 | 20.1 | 68.7 | 6.2 | 5.0 | | |
| 10* | 21.1 | 67.4 | | | | 11.5 |
| 11 | | 85.6 | 14.4 | | | |
| 12 | 80.6 | | | 19.4 | | |
| 13 | | 78.4 | 21.6 | | | |
| 14 | 25.2 | 51.3 | 16.2 | 7.3 | | |
| 15* | | 76.8 | | | 10.5 | 12.7 |
| 16 | | 73.4 | | 26.6 | | |
| 17 | 72.0 | | 18.0 | 10.0 | | |
| 18 | 71.0 | | 29.0 | | | |
| 19* | 68.8 | | 17.3 | 13.9 | | |
| 20* | | 67.9 | 11.7 | 20.4 | | |

| Sample | Flexural Strength | Hardness Hv | Corrosion Re- |
|---|---|---|---|

TABLE 1-continued

| No. | (Kg/mm²) | (Kg/mm²) | sistance | Hue |
|---|---|---|---|---|
| 1* | 20 | 800 | ◎ | (insufficient sintering) |
| 2* | 25 | 900 | ◎ | (insufficient sintering) |
| 3 | 35 | 1300 | ◎ | golden |
| 4 | 30 | 1200 | ◎ | golden |
| 5* | 70 | 1500 | Δ | golden |
| 6 | 30 | 1250 | ◎ | whitish golden |
| 7 | 65 | 1500 | ◎ | golden |
| 8 | 40 | 1400 | ◎ | whitish golden |
| 9 | 45 | 1330 | ◎ | whitish golden |
| 10* | 76 | 1500 | X | whitish golden |
| 11 | 38 | 1270 | ◎ | whitish golden |
| 12 | 55 | 1550 | ◎ | dark golden |
| 13 | 40 | 1300 | ◎ | whitish golden |
| 14 | 42 | 1350 | ◎ | whitish golden |
| 15* | 80 | 1600 | X | reddish golden |
| 16 | 45 | 1400 | ◎ | whitish golden |
| 17 | 42 | 1350 | ◎ | golden |
| 18 | 36 | 1280 | ◎ | golden |
| 19* | 20 | 750 | ◎ | (insufficient sintering) |
| 20* | 23 | 850 | ◎ | (insufficient sintering) |

Each asterisked sample was a comparative sample outside the scope of the present invention.

The corrosion resistance was evaluated according to the following scale:

◎: neither discoloration nor corrosion

Δ: discoloration

X: corrosion in addition to discoloration

As is seen from the results shown in Table 1, in each of samples 1, 2, 19 and 20, sintering was insufficient, and therefore, after the mirror polishing, the polished surface was prominently porous and the gloss was poor. In each of samples 5, 10 and 15 in which Ni or Mo was used as a comparative sintering aid, it was found at the corrosion test that the corrosion was advanced, and foggy discoloration was observed.

From the foregoing experimental results, it will readily be understood that when alumina or zirconia is used as the sintering aid according to the present invention, neither corrosion nor discoloration is caused at the corrosion test and also the flexural strength and hardness are good.

When the samples of the present invention were subjected to the salt spray test (JIS Z-2371-76) using an aqueous solution of sodium chloride (4 W/V %) and the dipping tests using an acetic acid-nitric acid solution, a concentrated sulfuric acid solution (50% by weight), a hydrofluoric acid solution (46% by weight), aqua regia and a potassium ferricyanide (10% by weight), it was found that each sample had a good corrosion resistance.

As is apparent from the foregoing description, the decorative hard golden ceramic article of the present invention is improved in the corrosion resistance over hard golden ceramic articles prepared by using the conventional metal sintering aids, while the flexural strength and hardness are maintained to practically satisfactory levels in the field of decorative articles, and that the decorative article of the present invention can be used valuably as a watch case, a medal, a bracelet, a ring, a button, a pendant, a tapestry or other decorative member.

What is claimed is:

1. A decorative hard golden ceramic article consisting essentially of at least one member selected from titanium nitride and zirconium nitride as the main component, and 0.1 to 5% by weight of at least one member selected from alumina ($Al_2O_3$) and zirconia ($ZrO_2$).

2. A ceramic article as set forth in claim 1, wherein the Vickers hardness (Hv) is at least 1200 Kg/mm².

3. A ceramic article as set forth in claim 1 wherein the flexural strength is at least 30 Kg/mm².

4. A method for making a decorative hard golden ceramic article comprising the steps of:

(a) forming a powdered mixture consisting essentially of at least one member selected from titanium nitride and zirconium nitride as the main component, and 0.1 to 5% by weight of at least one member selected from alumina ($Al_2O_3$) and zirconia ($ZrO_2$);

(b) molding said mixture into a desired shape; and (c) sintering the molded mixture in a non-oxidizing atmosphere.

5. The method according to claim 4 wherein said mixture in step (a) is formed by grinding said main component with a ball of alumina or zirconia.

6. The method according to claims 4 or 5 wherein, in step (c), said sintering is conducted in a vacuum.

7. A product produced according to the method of claim 4.

8. A product produced according to the process of claim 6.

* * * * *